United States Patent
Li et al.

(10) Patent No.: US 12,189,622 B2
(45) Date of Patent: Jan. 7, 2025

(54) EFFICIENT CACHE BUILD AND QUERY PATTERN SUPPORTING DYNAMIC AND RELATIONAL PROPERTIES

(71) Applicant: SAP SE, Walldorf (DE)

(72) Inventors: Peihui Li, Shanghai (CN); Xia Yu, Shanghai (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/951,799

(22) Filed: Sep. 23, 2022

(65) Prior Publication Data
US 2024/0104094 A1    Mar. 28, 2024

(51) Int. Cl.
*G06F 16/24*    (2019.01)
*G06F 16/22*    (2019.01)
*G06F 16/2453*    (2019.01)

(52) U.S. Cl.
CPC .... *G06F 16/24539* (2019.01); *G06F 16/2246* (2019.01)

(58) Field of Classification Search
CPC ........................ G06F 16/24539; G06F 16/2246
See application file for complete search history.

(56) References Cited

U.S. PATENT DOCUMENTS

| | | | |
|---|---|---|---|
| 10,489,381 B2 | 11/2019 | Yu et al. | |
| 10,503,572 B2 | 12/2019 | Peng et al. | |
| 10,565,089 B2 | 2/2020 | Yu et al. | |
| 11,153,374 B1 | 10/2021 | Yu et al. | |
| 11,334,558 B2 | 5/2022 | Yu et al. | |
| 11,409,570 B2 | 8/2022 | Yu et al. | |
| 2004/0015489 A1* | 1/2004 | Anonsen | G06F 16/289 |
| 2008/0147627 A1 | 6/2008 | Natkovich | |
| 2020/0201865 A1* | 6/2020 | Siebeking | G06F 9/541 |
| 2021/0173838 A1 | 6/2021 | Yu et al. | |
| 2022/0156240 A1* | 5/2022 | Smith | G06F 16/2358 |

OTHER PUBLICATIONS

U.S. Appl. No. 17/836,042, filed Jun. 9, 2022, Feng et al.

\* cited by examiner

*Primary Examiner* — Apu M Mofiz
*Assistant Examiner* — Cindy Nguyen
(74) *Attorney, Agent, or Firm* — Fish & Richardson P.C.

(57) ABSTRACT

Methods, systems, and computer-readable storage media for providing two or more map paths, each map path representing a set of models and relationships between models for data stored in a database system, combining the two or more map paths to provide a map path tree that at least partially defines a data structure for storing at least a portion of the data stored in the database system in the cache, querying the database system by recursively traversing the map path tree to retrieve data instances from the database system, and storing each data instance in the cache using the data structure.

20 Claims, 9 Drawing Sheets

EFFICIENT CACHE BUILD AND QUERY PATTERN SUPPORTING DYNAMIC AND RELATIONAL PROPERTIES

BACKGROUND

Enterprises can use enterprise applications to support and execute operations. In some arrangements, applications interact with database systems to store and retrieve data. For example, an application can query a database system to read data from and/or write data to a database maintained within the database system. Accessing data in a database system implies latency, which can be described as a time between issuing of a query to the database system and received a response to the query. Relatively long latency can be characterized as poor performance of the database system and can delay execution of downstream actions (e.g., actions that are to be executed based on data that is accessed).

A frequency of access to data can result in data being classified as hot data or cold data. In some examples, hot data refers to data that is more frequently accessed, while cold data refers to data that is less frequently accessed. For hot data, in particular, latency should be minimized. To achieve this, a cache can be provided to store data that is determined to be hot data. A cache provides much faster access to data stored therein (lower latency), while accessing data in a database system is slower (higher latency). In view of this, data, such as hot data, can be copied to a cache to enable more rapid access to the data. While database systems have advantages in querying and storage of data, their relatively higher latency is a disadvantage. Further, database systems store and query data based on a data schema that is specified. Copying data from a database system to a cache needs to address this data schema.

SUMMARY

Implementations of the present disclosure are directed to building a cache to stored data from a database system. More particularly, implementations of the present disclosure are directed to building a cache by defining a data structure for data objects based on a data schema of a database system and copying data to the cache.

In some implementations, actions include providing two or more map paths, each map path representing a set of models and relationships between models for data stored in a database system, combining the two or more map paths to provide a map path tree that at least partially defines a data structure for storing at least a portion of the data stored in the database system in the cache, querying the database system by recursively traversing the map path tree to retrieve data instances from the database system, and storing each data instance in the cache using the data structure. Other implementations of this aspect include corresponding systems, apparatus, and computer programs, configured to perform the actions of the methods, encoded on computer storage devices.

These and other implementations can each optionally include one or more of the following features: the relationships include one-way parent-child relationships between models in the set of models; actions further include determining that a relationship represented in the map path tree includes a violation of a one-way parent-child relationship, and adjusting the map path tree to obviate the violation; each map path comprises two or more period-separated model names, each model name representative of a model in the set of models; providing a cache is executed in response to an event including one or an expiration event, a manual event, and application start-up event; each instance is stored as a data object based on one of Javascript object notation (JSON) and extensible markup language (XML); and the database system includes a relational database and data is stored in two or more relational tables within the database system.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
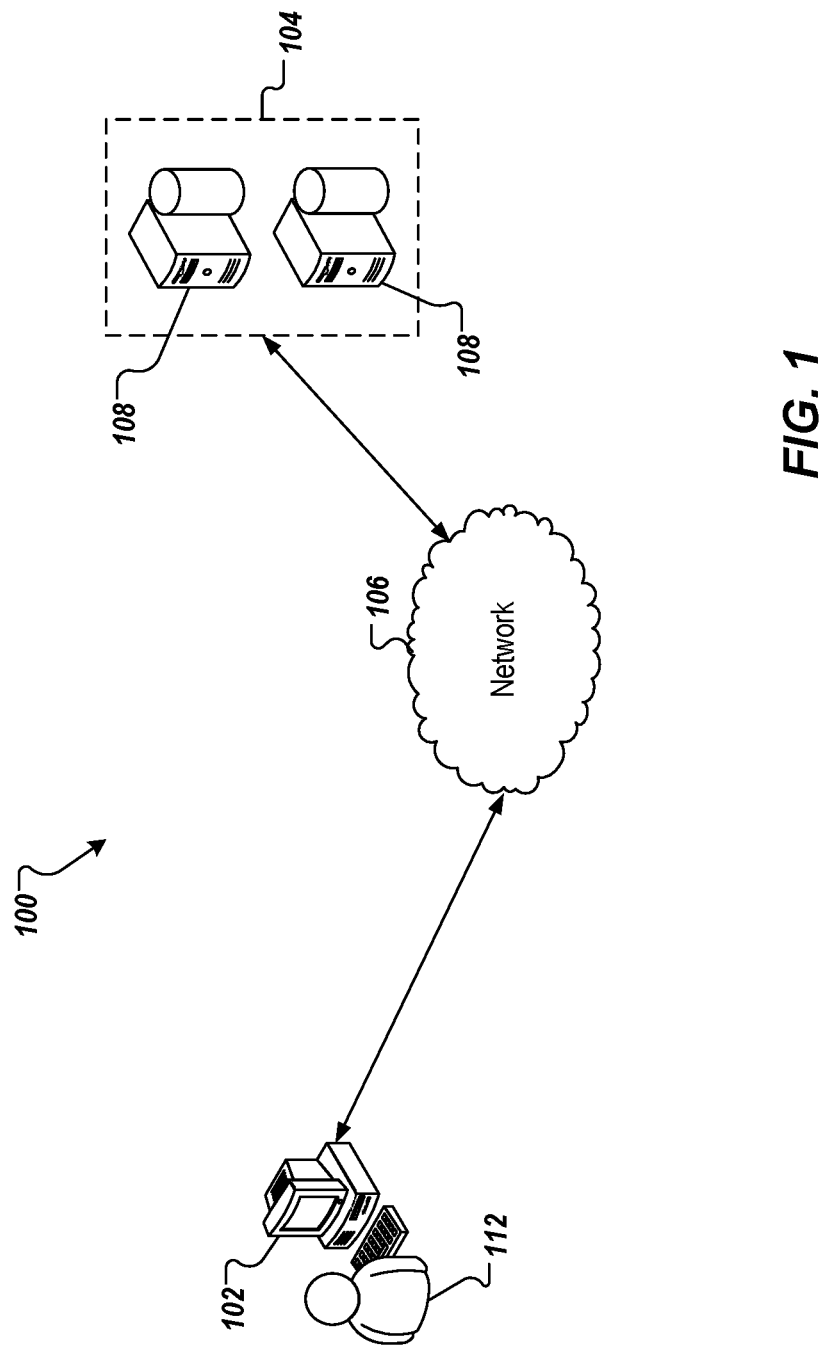
FIG. 1 depicts an example architecture that can be used to execute implementations of the present disclosure.

Implementations of the present disclosure are directed to building a cache to stored data from a database system. More particularly, implementations of the present disclosure are directed to building a cache by defining a data structure for data objects based on a data schema of a database system and copying data to the cache. In some implementations, actions include providing two or more map paths, each map path representing a set of models and relationships between models for data stored in a database system, combining the two or more map paths to provide a map path tree that at least partially defines a data structure for storing at least a portion of the data stored in the database system in the cache, querying the database system by recursively traversing the map path tree to retrieve data instances from the database system, and storing each data instance in the cache using the data structure.

To provide further context for implementations of the present disclosure, and as introduced above, enterprises can use enterprise applications to support and execute operations. In some arrangements, applications interact with database systems to store and retrieve data. For example, an application can query a database system to read data from and/or write data to a database maintained within the database system. Accessing data in a database system implies latency, which can be described as a time between issuing of a query to the database system and receiving a response to the query. Relatively long latency can be characterized as poor performance of the database system and can hinder execution of downstream actions (e.g., actions that are to be executed based on data that is accessed).

A frequency of access to data can result in data being classified as hot data or cold data. In some examples, hot data refers to data that is more frequently accessed, while cold data refers to data that is less frequently accessed. For hot data, in particular, latency should be minimized. To achieve this, a cache can be provided to store data that is determined to be hot data. A cache provides a much faster access to data stored therein (lower latency), while accessing data in a database system is slower (higher latency). In view of this, data, such as hot data, can be copied to a cache to enable more rapid access to the data. While database systems have advantages in querying and storage of data, their relatively higher latency is a disadvantage. Further, database systems store and query data based on a data schema that is specified. Copying data from a database system to a cache needs to address this data schema.

However, in some instances, the data schema may not be able to be determined ahead of time and/or the data schema can change. For example, and without limitation, a configuration management database (CMDB) system can be considered, in which data representing hardware assets and software assets of an enterprise is stored. Modern CMDB systems enables data schema to be defined dynamically. However, this presents technical challenges in caching data for subsequent querying of the data from the cache.

In view of the above context, implementations of the present disclosure provide a cache pattern that supports dynamic and relational querying of data stored in a cache. As described in further detail herein, implementations of the present disclosure provide a data structure on demand by extracting similarities of data and a data schema within a database system to provide a data structure for storing data objects in a cache. The data structure corresponds to the data schema and relationships between data within the database system. In this manner, queries can be executed over data objects stored in the cache with a lower latency than the queries being executed on the database system.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106). In some examples, the server system 104 can provision a cloud platform that hosts one or more cloud-based applications.

In accordance with implementations of the present disclosure, the server system 104 can host a database system (e.g., a CMDB system) that enables access to data. For example, queries can be submitted to the database system to read and/or write data stored therein. In some implementations, at least a portion of data stored in the database system is to be stored in a cache to enable more rapid access to the data. For example, and as described in further detail herein, a data structure is defined based on a data schema of the database system, data stored in the database system is adapted to the data structure, and a cache is built by storing data objects in the cache, each data object corresponding to the data structure. In some examples, the cache is stored in computer-readable memory (e.g., random access memory (RAM)) and queries can be executed over data objects stored within the cache. In some examples, the cache (e.g., a copy of the cache) is stored in the database system.

Figure 2:
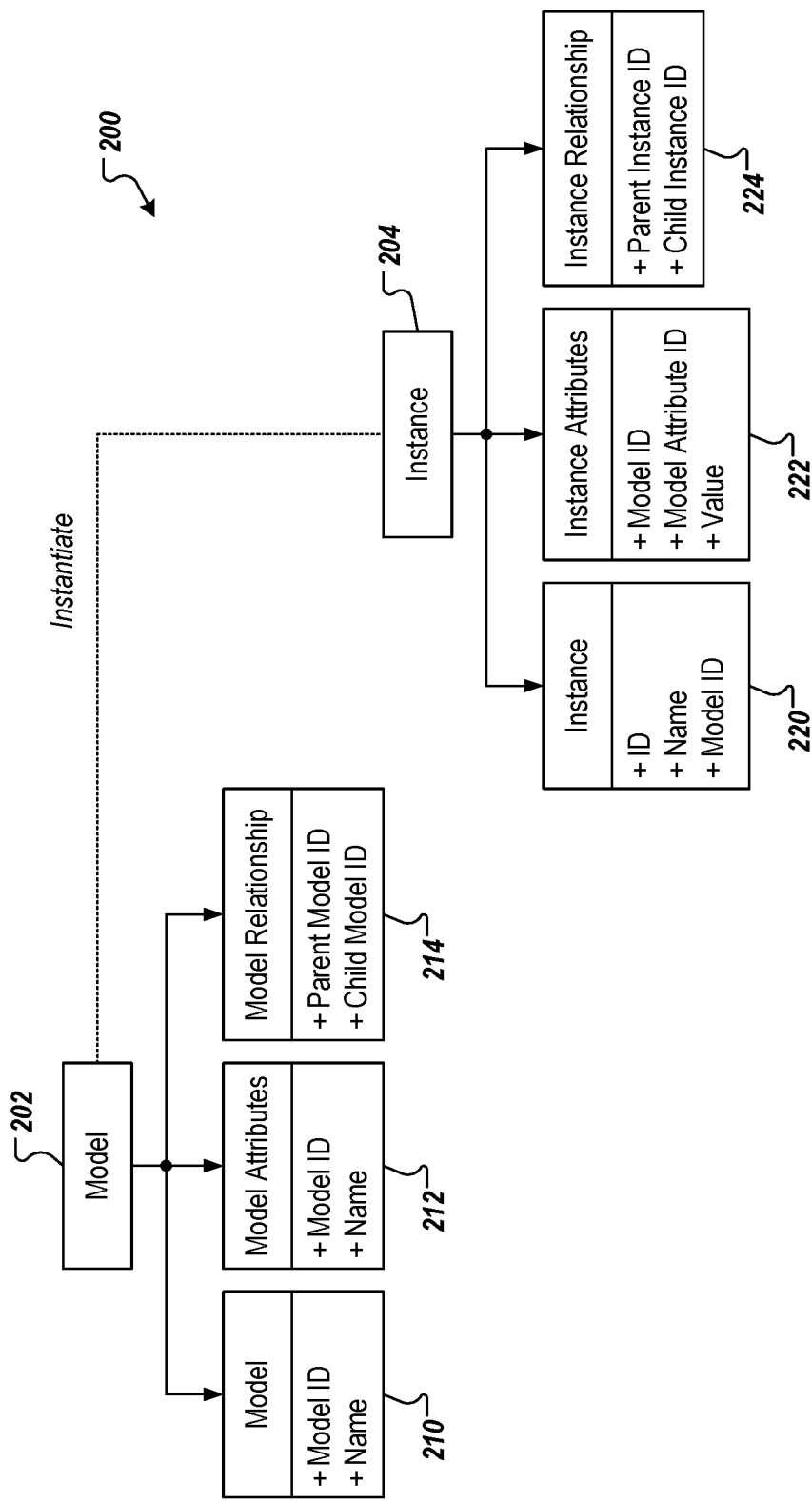
FIG. 2 depicts an example relationship between models and instances of models in accordance with implementations of the present disclosure.

FIG. 2 depicts an example relationship 200 between a model 202 and instances 204 of the model 202 in accordance with implementations of the present disclosure. In some examples, an instance 204 is instantiated from the model 202 by reading data from a database into the instance 204 by an application. In this manner, the application provides a map path representative of the instance 204, which is stored in the database for subsequent use, as described herein.

In the example of FIG. 2, the model 202 is associated with model information 210, model attributes 212, and model relationships 214. In some examples, a model 202 can represent an entity within a domain. For example, and in the example domain of configuration management, the model can represent a data center (DC), a cluster (e.g., a group of host machines within a DC), a host, or a service (e.g., software executed by a host). In some examples, the model information 210 can include an identifier (ID) and a model name. In some examples, the model attributes 212 can include, for each attribute, a model ID (e.g., identifying the model, to which an attribute belongs) and an attribute name. In some examples, the model relationship 214 can include a parent model ID and a child model ID and represents a one-way parent child relationship between models. Each model 202 has a single attribute as a primary key, where the value of the key represents a respective instance 204 of the model 202.

In the example of FIG. 2, each instance 204 is associated with instance information 220, instance attributes 222, and instance relationships 224. In some examples, an instance 204 represents a specific instance of an entity within a domain. That is, each instance 204 represents a specific instance of a model 202. As such, there can be a one-to-many relationship, such that a model 202 (e.g., a DC) can have multiple instances (e.g., specific DCs). For example, and in the example domain of configuration management, the model can represent a specific DC, a specific cluster, a specific host, or a specific service. In some examples, the instance information 220 can include an ID (that uniquely identifies the instance), an instance name, and a model ID (that uniquely identifies the model that the instance is an instance of). In some examples, the instance attributes 222 can include, for each attribute, a model ID (e.g., identifying the model, to which an attribute belongs), a model attribute ID, and a value. In some examples, the instance relationship 224 can include a parent instance ID and a child instance ID and represents a one-way parent child relationship between instances.

In some implementations, a map path is provided and can represent relationships between two or more models. In some examples, the map path can be provided as a sequence of, for example, period-separated model names. In the example domain of configuration management, an example map path can include, without limitation, DC.cluster.host-.service. In a map path, adjacent model names have a defined model relationship (e.g., model name on left is a parent model to model name on right, which is a child model). In some implementations, a root model is a model within a map path and/or map tree that does not have a parent model. For example, using the non-limiting map path of DC.cluster.host.service, DC is the root model.

In some implementations, a map tree represents intersections between multiple map paths. For example, a first map path can include DC.cluster.host.service, introduced above, and a second map path can include DC.cluster.application-.group.host. In this example, DC, cluster, and host are common (intersections) between the first map path and the second map path.

In accordance with implementations of the present disclosure, one or more caches can be built in response to occurrence of an event. Example events can include, without limitation, start-up of an application that will query a cache, a manual request to build (re-build) a cache, a cache being expired (e.g., the time since the cache was created exceeding a threshold time).

Figure 3:
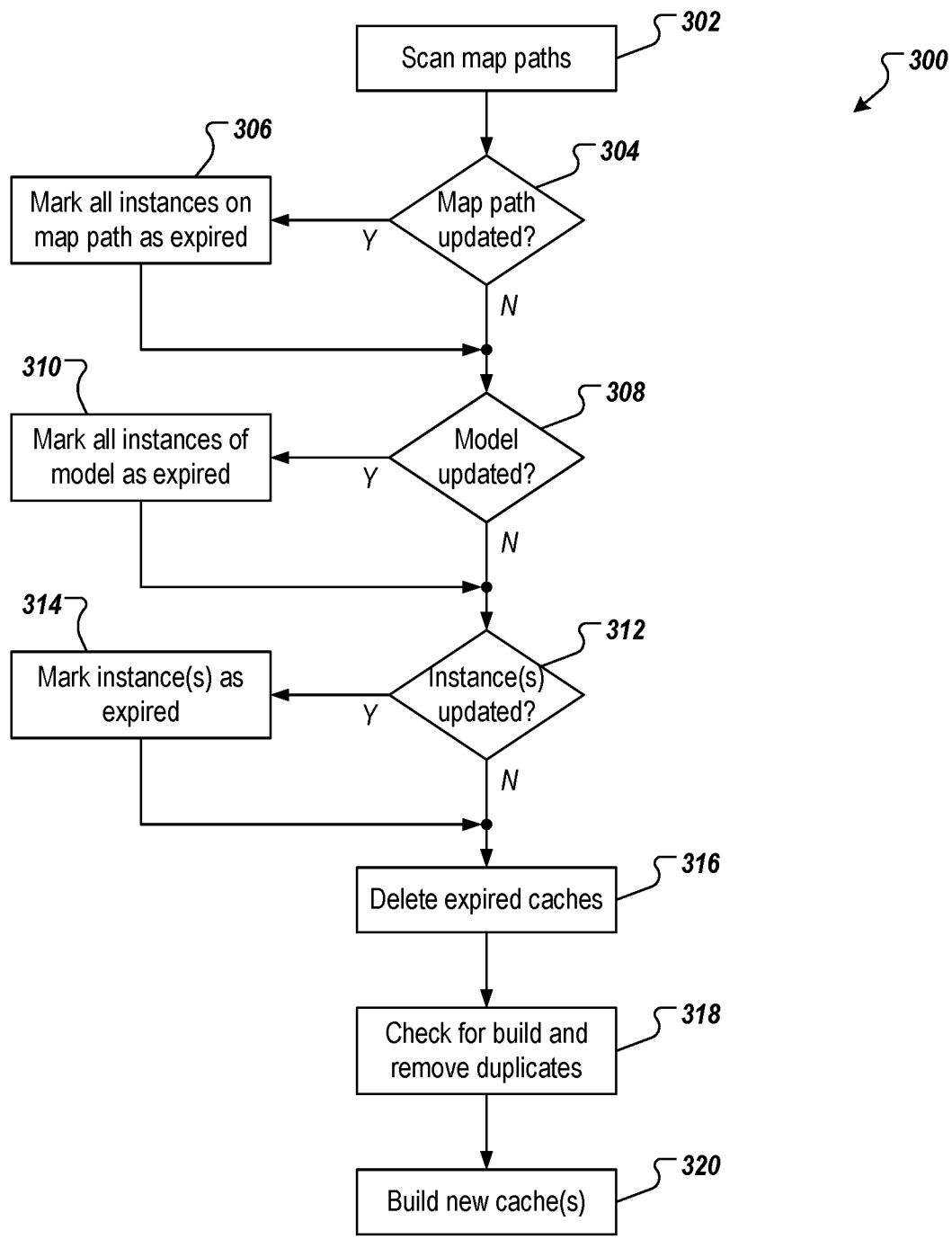
FIG. 3 depicts an example process that can be executed in accordance with implementations of the present disclosure.

FIG. 3 depicts an example process 300 that can be executed in accordance with implementations of the present disclosure. In some examples, the example process 300 is provided using one or more computer-executable programs executed by one or more computing devices. In some examples, the example process 300 is performed to build (or re-build) caches. For example, the example process 300 can be initiated in response to an event that triggers build (or re-build) of a cache.

One or more map paths are scanned (302). For example, and as described above, an instance is created (instantiated) by reading data from a database into the instance by an application, the application providing a map path representative of the instance and stores the map path in the database. In some examples, an application that is to query the database can be associated with two or more map paths that can be used for accessing data. With non-limiting reference to the examples above, example map paths can include the first map path DC.cluster.host.service and the second map path DC.cluster.application.group.host. In some examples, each map path is associated with metadata that can include, for example, a path update date (e.g., a date-time timestamp) that indicates a date on which the respective map path was updated. In some examples, each map path indicates a set of models (e.g., DC model, host cluster model, host model, service model). Metadata associated with each model can be stored within the database system. Example metadata can include, without limitation, a model update date (e.g., a date-time timestamp) indicating a date that a respective model was last updated. In some examples, for each model in the set of models, data in the database can be queried to identify instances of the model, each instance having metadata associated therewith. Example metadata can include, without limitation, an instance update date (e.g., a date-time timestamp) indicating a date that a respective instance was last updated.

For each map path, it is determined whether the map path has been updated (304). For example, it can be determined whether the map path has been updated since a path date. The path date can include, for example and without limitation, a latest path date indicating the last date that the respective map path was used to build a cache, and a cache creation date indicating when a cache that is being re-built based on the map path was created. In some examples, if the path update date is more recent than the path date, it is determined that the map path has been updated. If the map path is determined to be updated, all instances on the map path are marked as expired (306). That is, all instances of all models on the map path are marked as expired.

For each model along each map path, it is determined whether the model has been updated (308). For example, it can be determined whether the model has been updated since a model date. The model date can include, for example and without limitation, a latest model date indicating the last date that the respective model was used to build a cache, and a cache creation date indicating when a cache that is being re-built based on the model was created. In some examples, if the model update date is more recent than the model date, it is determined that the model has been updated. If it is determined that the model is updated, all instances of the respective model are marked as expired (310). That is, all instances of the respective model on the map path are marked as expired.

For each instance of each model along each map path, it is determined whether the instance has been updated (312). For example, it can be determined whether the instance has been updated since an instance date. The instance date can include, for example and without limitation, a latest instance date indicating the last date that the respective instance was used to build a cache, and a cache creation date indicating when a cache that is being re-built based on the instance was created. In some examples, if the instance update date is more recent than the instance date, it is determined that the instance has been updated. If it is determined that the instance is updated, the instance is marked as expired (314). That is, all instances of all models on the map path are marked as expired.

Any expired caches are deleted (316). For example, any cache that corresponds to an expired map path, an expired model, and/or an expired instance is deleted (i.e., from computer-readable memory). Build is checked and any duplicates are removed (318). In some examples, a duplicate can be described as a map path that is a sub-path of another map path. For example, a first map patch can be represented as 1→2→3→4 and a second map path can be represented as 1→2→3. In this example, the entirety of the second map path is a sub-path of the first map path. Consequently, the second map path can be considered a duplicate and ignored when combining map paths, as described in further detail here. One or more new caches are built (320). For example, and as described in further detail herein with reference to FIG. 5, a cache is built by joining map paths to provide a map path tree, adjusting the map path tree, if needed, and storing data objects in the cache, each data object corresponding to a data structure represented by the map path tree.

In some implementations, tables are provided within a database system to store data corresponding to one or more data schemas defined for the database system. Continuing with the non-limiting example of configuration management, the database system can store data representative of multiple DCs. In some examples, DCs can have disparate configurations that are represented in the data schemas of the database system. In some examples, one or more predefined models and relationships between models are provided to represent the data schemas of the database system. For example, Table 1 and Table 2, below, represent models and relationships for the first map path DC.cluster.host.service, which can represent a configuration of one or more DCs:

TABLE 1

Model Table

| Model Name | Model Attributes | Description |
| --- | --- | --- |
| DC | DC (Key) | a datacenter |
|  | DC location | datacenter location |
| cluster | cluster (Key) | grouped hosts |
| host | hostname (Key) | host name |
| service | service (Key) | service name |
|  | service port | 0-65535 number |
|  | service JDK | Java Development Kit version |

TABLE 2

Model Relationship Table

| Parent Model | Child Model |
| --- | --- |
| DC | cluster |
| cluster | host |
| host | service |

As another example, Table 3 and Table 4, below, represent models and relationships for the second map path DC.cluster.application.group.host, which can represent a configuration of one or more DCs:

TABLE 3

Model Table

| Model Name | Model Attributes | Description |
| --- | --- | --- |
| DC | DC (Key) | a datacenter |
|  | DC location | datacenter location |
| cluster | cluster (Key) | grouped hosts |
| application | Application (Key) | application identifier |
| group | Group (Key) | group name |
| host | hostname (Key) | host name |

TABLE 4

Model Relationship Table

| Parent Model | Child Model |
| --- | --- |
| DC | cluster |
| cluster | application |
| application | group |
| group | host |

In some implementations, the data structure is predefined on demand. More particularly, for the data, similarities of data can be extracted, and a schema defined that is based on needs. The model table and the model relationship tables are predefined. The data structure to store values can be predefined by need (e.g., organization of DCs within an enterprise). If the data (real data in database) can be read into model-model relationship instances and built map paths, any predefined data structure that is used to store the data can be used.

In some implementations, data stored in the database system is adapted based on the provided models and relationships. For example, and with continued reference to the non-limiting example of configuration management, example data stored in the database system can be provided as:

TABLE 5

Example Data

| DC | DC location | cluster | hostname | service | service port | service JDK |
| --- | --- | --- | --- | --- | --- | --- |
| DC02 | Shanghai | clusterA | hostA | serviceA | 8080 | JDK1 |
| DC02 | Shanghai | clusterB | hostB | serviceB | 8080 | JDK1 |
| ... | ... | ... | ... | ... | ... | ... |
| DC26 | Munich | clusterR | hostR | serviceA | 8080 | JDK1 |
| ... | ... | ... | ... | ... | ... | ... |

The example data of Table 5 can be adapted based on the models and instances to provide:

TABLE 6

Example Data in view of Models

| | models | | | |
| --- | --- | --- | --- | --- |
| | DC | cluster | host | service |
| | model attributes | | | |
| | DC(Key) | DC location | cluster (Key) | hostname (Key) | service (Key) | service port | service JDK |
| instances | DC02, . . . , DC26, . . . | | clusterA, cluster B, clusterR | hostA, host B, hostR | serviceA, serviceB | | |

TABLE 6-continued

Example Data in view of Models

| | | models | | | | | |
|---|---|---|---|---|---|---|---|
| | | DC | cluster | host | | service | |
| | | | | model attributes | | | |
| | DC(Key) | DC location | cluster (Key) | hostname (Key) | service (Key) | service port | service JDK |
| instance attributes | DC02 | Shanghai | clusterA | hostA | serviceA | 8080 | JDK1 |
| | DC02 | Shanghai | clusterB | hostB | servcieB | 8080 | JDK1 |
| | ... | ... | ... | ... | ... | ... | ... |
| | DC26 | Munich | clusterR | hostR | serviceA | 8080 | JDK1 |
| | ... | ... | ... | ... | ... | ... | ... |

The key values can be used to represent respective instances as adapted data. For example:

TABLE 7

Example Adapted Data for Respective Instances

| parent instance | child instance |
|---|---|
| DC02 | clusterA |
| clusterA | hostA |
| hostA | serviceA |
| DC02 | clusterB |
| clusterB | hostB |
| hostB | serviceB |
| DC26 | clusterR |
| clusterR | hostR |
| hostR | serviceA |

In accordance with implementations of the present disclosure, the cache is built based on the adapted data. In some examples, map paths are joined to provide a map tree. For example, and as described in further detail herein, each map path is represented as a graph, each graph including nodes, each node representing a model of the map path, and edges between nodes, each edge representing a relationship between nodes (models). In some examples, the graph is a uni-directional graph representing one-way parent-child relationships between nodes (models). Multiple map paths are joined based on common nodes to provide a map path tree. In some examples, the map path tree is adjusted, if needed, based on relationships between models.

In further detail, FIGS. 4A-4D depicts respective examples of joining map paths and adjusting joined map paths in accordance with implementations of the present disclosure.

Figure 4A:
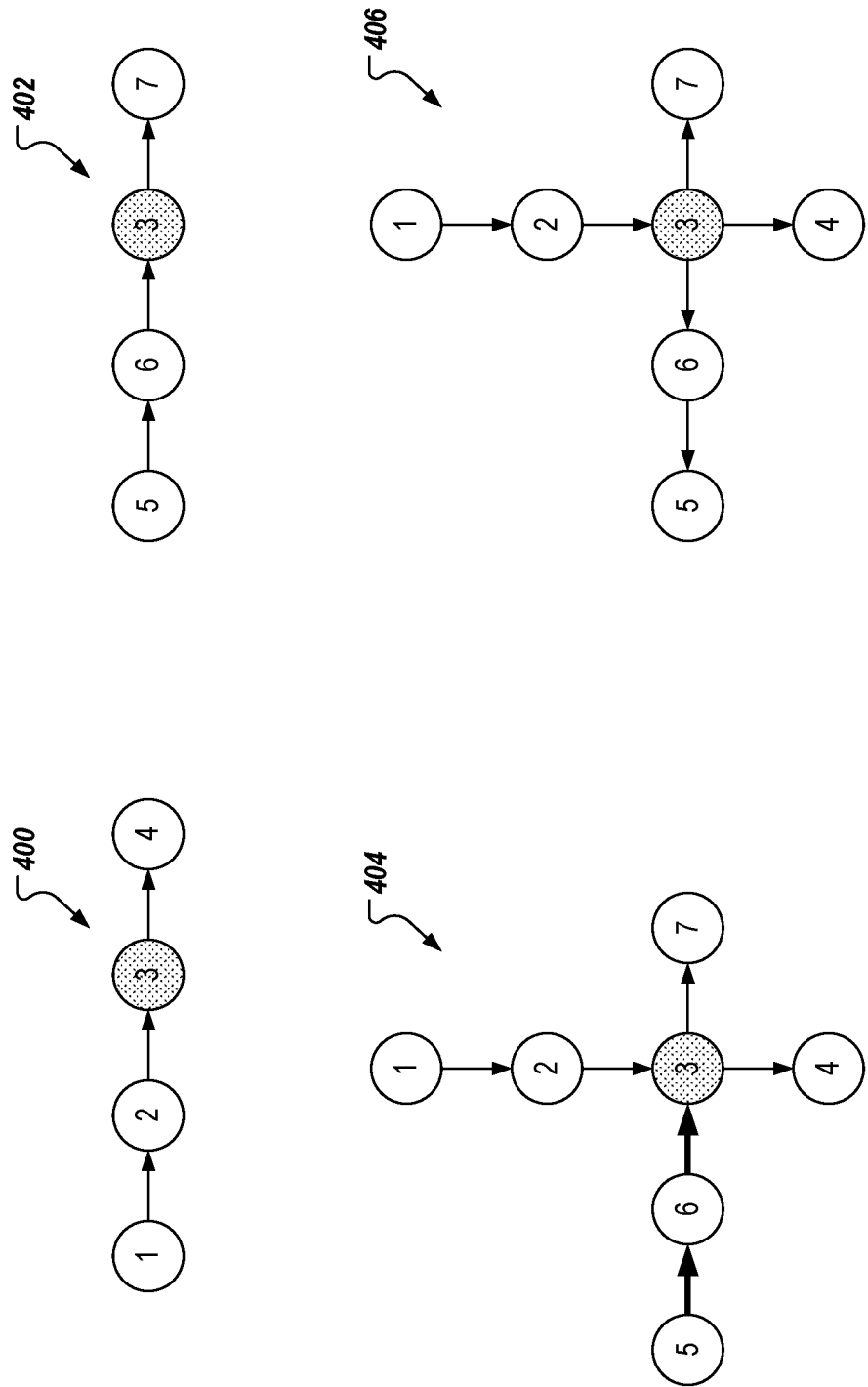
FIGS. 4A-4D depicts respective examples of joining map paths and adjusting joined map paths in accordance with implementations of the present disclosure.

With particular reference to FIG. 4A, a map paths list can include a first map path represented as a first map path graph 400 and a second map path represented as a second map path graph 402. In the example of FIG. 4A, each node in the first map path graph 400 and the second map path graph 402 represents a model. From left to right, the first node of each of the first map path graph 400 and the second map path graph 402 is a root node, and the direction of the edges represent parent-child relationships.

In accordance with implementations of the present disclosure, map paths are joined to provide a map path tree. In the example of FIG. 4A, the first map path graph 400 and the second map path graph 402 are joined to provide a map path tree graph 404 representing the map path tree. As depicted in FIG. 4A, nodes that are common to both the first map path graph 400 and the second map path graph 402 (shaded) are used to join and provide the map path tree 404. Through joining, duplicate relationships are deleted and multiple relationships are combined. Non-common nodes in the map paths have relationships through the common node(s) after joining. In the example of FIG. 4A, the node 4 and the node 7 (non-common nodes) have a relationship through the node 3 (common node).

In some implementations, a map path tree is adjusted. For example, each map path tree is to be provided as a uni-directional graph to represent one-way parent-child relationships between nodes. Joining map paths to provide a map path tree can result in a violation of this. For example, and with reference to FIG. 4A, the map path tree 404 violates one-way parent-child relationships between nodes, because the node 3 has multiple parent nodes, namely the node 2 and the node 6. Consequently, the map path tree 404 is adjusted to reverse the relationship of the node 6 to the node 3 and the node 5 to the node 6, which results in a map path tree 406. This adjustment is achievable without adverse side-effects. For example, and using the example data of DC02 and clusterA above, clusterA can be found based on DC02 and DC02 can be found based on clusterA.

Figure 4B:
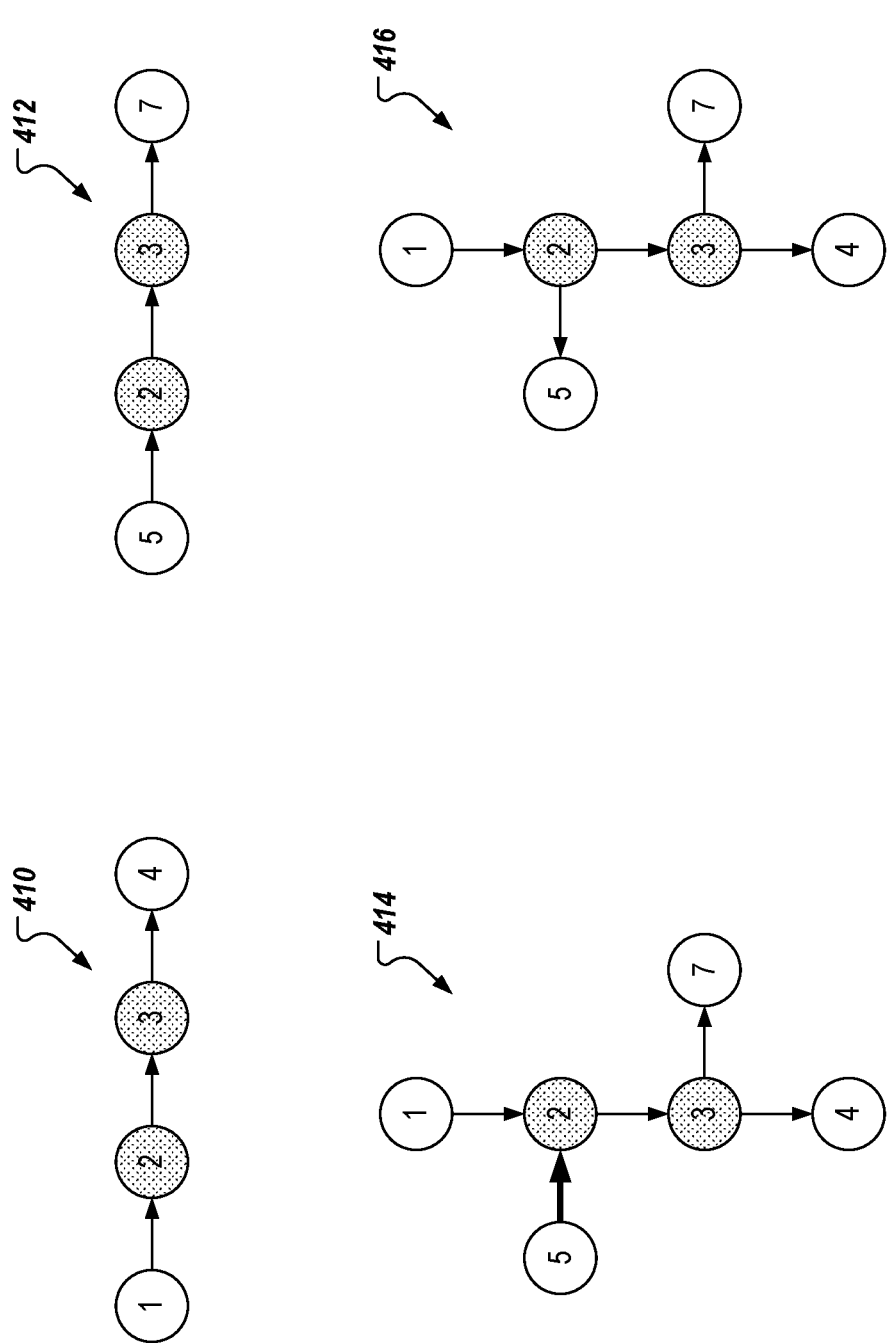
Figure 4C:
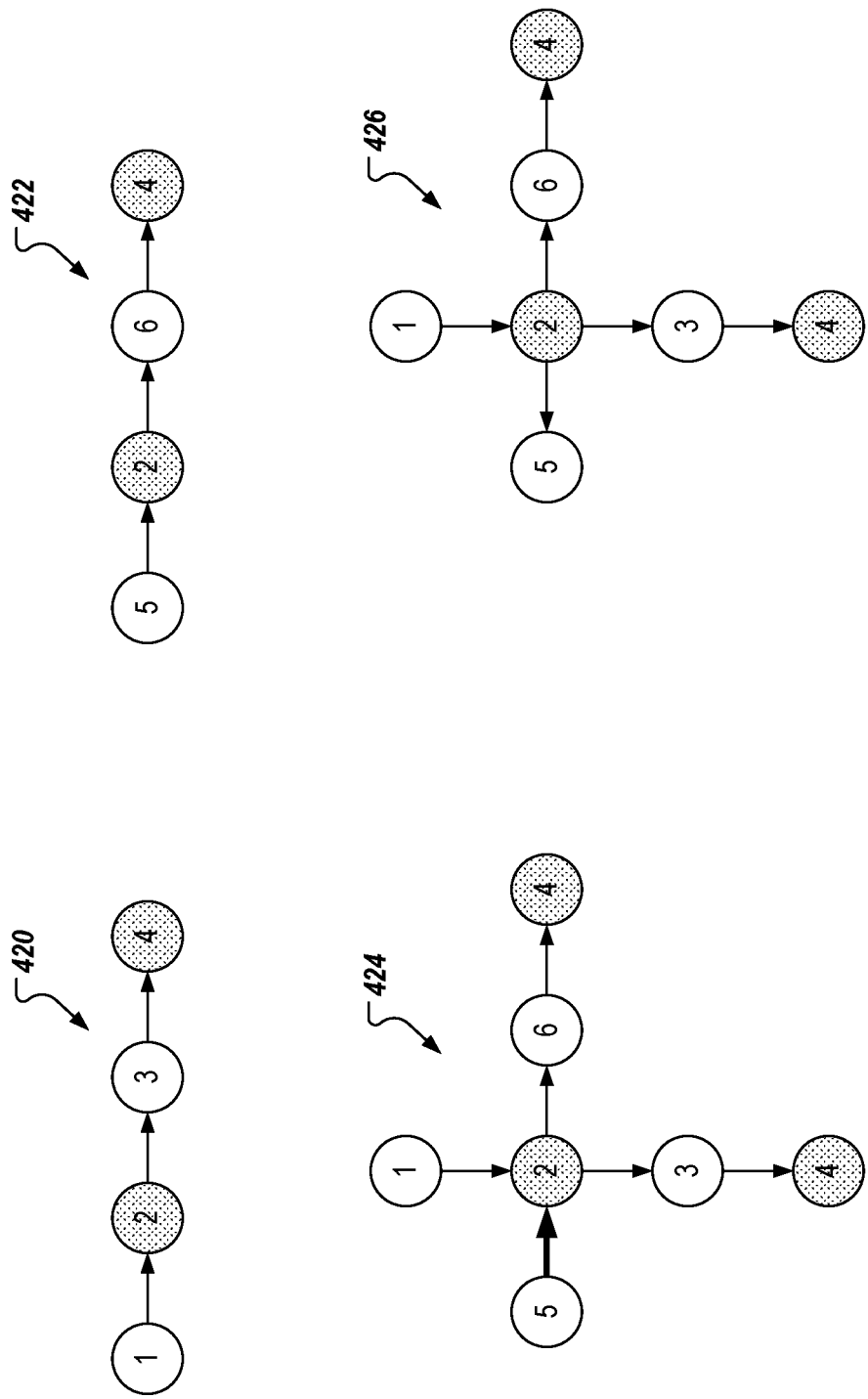
Figure 4D:
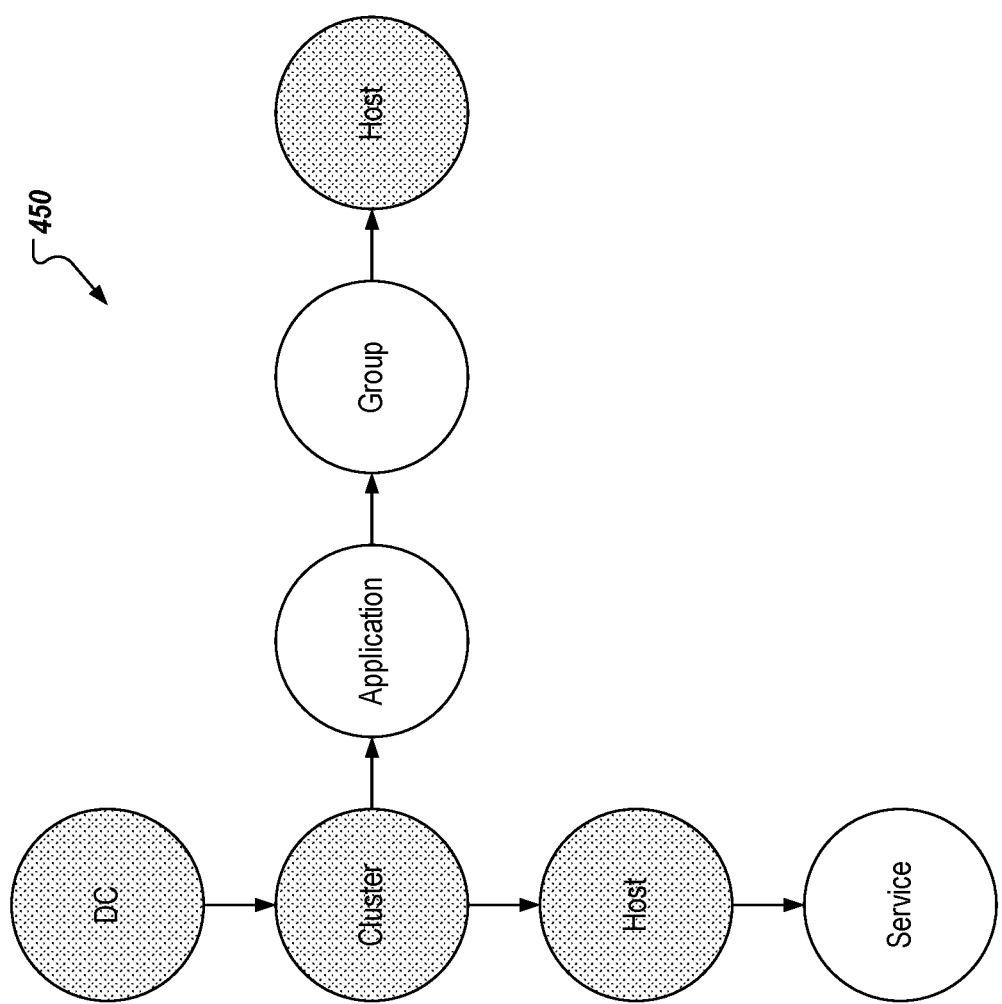

FIG. 4B depicts an example of a first map path 410 and a second map path 412 having multiple contiguous nodes in common, resulting in a map path tree 414 that is adjusted to provide a map path tree 416. FIG. 4C depicts an example of a first map path 420 and a second map path 422 having multiple non-contiguous nodes in common, resulting in a map path tree 424 that is adjusted to provide a map path tree 426. FIG. 4D depicts an example map path tree 450 based on the non-limiting example of the first map path DC.cluster.host.service and the second map path DC.cluster.application.group.host.

In accordance with implementations of the present disclosure, the map path tree is used to query the database system (i.e., relational tables) to retrieve data and populate data objects based on a data structure defined by the map path. More particularly, the map path tree is recursively traversed to query instances and attributes of instances. For example, beginning at the root node, instances of the root node are queried and attributes are retrieved, and querying continues for instances of child nodes and respective attributes, down until instances of all nodes have been queried and respective attributes retrieved. In some examples, after at least two nodes are processed, the chain is determined and is written to the cache.

As introduced above, each instance is written as a data object in the cache based on the data structure represented in the map tree. By way of non-limiting example, Listing 1, below, provides an example data structure for storing data objects in the cache:

Listing 1: Example Cache Data Structure

```
"_source" : {
  "root" : {
    "DC" : {
      "DC" : "DC02",
      "DC location" : "Shanghai",
      "cluster" : {
        "cluster : "clusterA",
        "host" : {
          "hostname" : "hostA"
          "service" : {
            "service" : "serviceA"
            "service port" : "8080"
            "service JDK" : "JDK1.8"
          }
        }
      }
    }
  },
  "mapPath" : "DC.cluster.host.service"
}
```

Data objects can be stored using any appropriate mechanism (e.g., Javascript object notation (JSON), extensible markup language (XML)).

In accordance with implementations of the present disclosure, after the cache is built, data stored in the cache can be queried. In some examples, a query can include a target model, at least a portion of a map path (e.g., a wildcard, such as * can be included), and one or more query criteria. By way of non-limiting example, an example query to determine the hosts on DC02 can include:

target model: host
map path: DC.*. host
criteria: {"DC":" DC02" }

The query can be executed over the data stored in the cache, which can return a query result of 'hostA' and 'hostB' based on the example data introduced above. Notwithstanding that the example query and other examples provided herein are relatively simple, implementations of the present disclosure enable data to be retrieved from the cache more efficiently than being retrieved from a database system.

Figure 5:
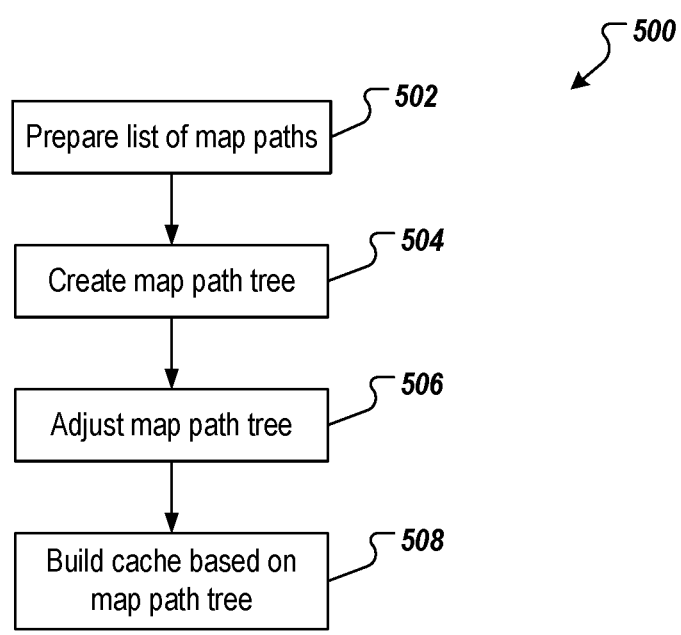
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices. In some examples, the example process 500 is performed to build caches.

A list of map paths is prepared (502). For example, map paths, based upon which, a cache is to be built are included in the list of map paths. Continuing with the examples above, an example list of map paths can include the first map path DC.cluster.host.service and the second map path DC.cluster.application.group.host. In some examples, and as described in further detail herein.

A map path tree is created (504). For example, and as described in detail herein, map path graphs are provided for each map path, and are joined based on common nodes to provide a map path tree. In some examples, the map path tree is adjusted (506). For example, if a map path tree violates a one-way parent-child relationship between nodes, a direction of one or more edges is reversed to obviate the violation. Cache data is built based on the map path tree (508). For example, and as described herein, the map path tree is used to recursively query instances from the database system and store each instance as a data object in the cache using the data structure represented by the map path tree.

Figure 6:
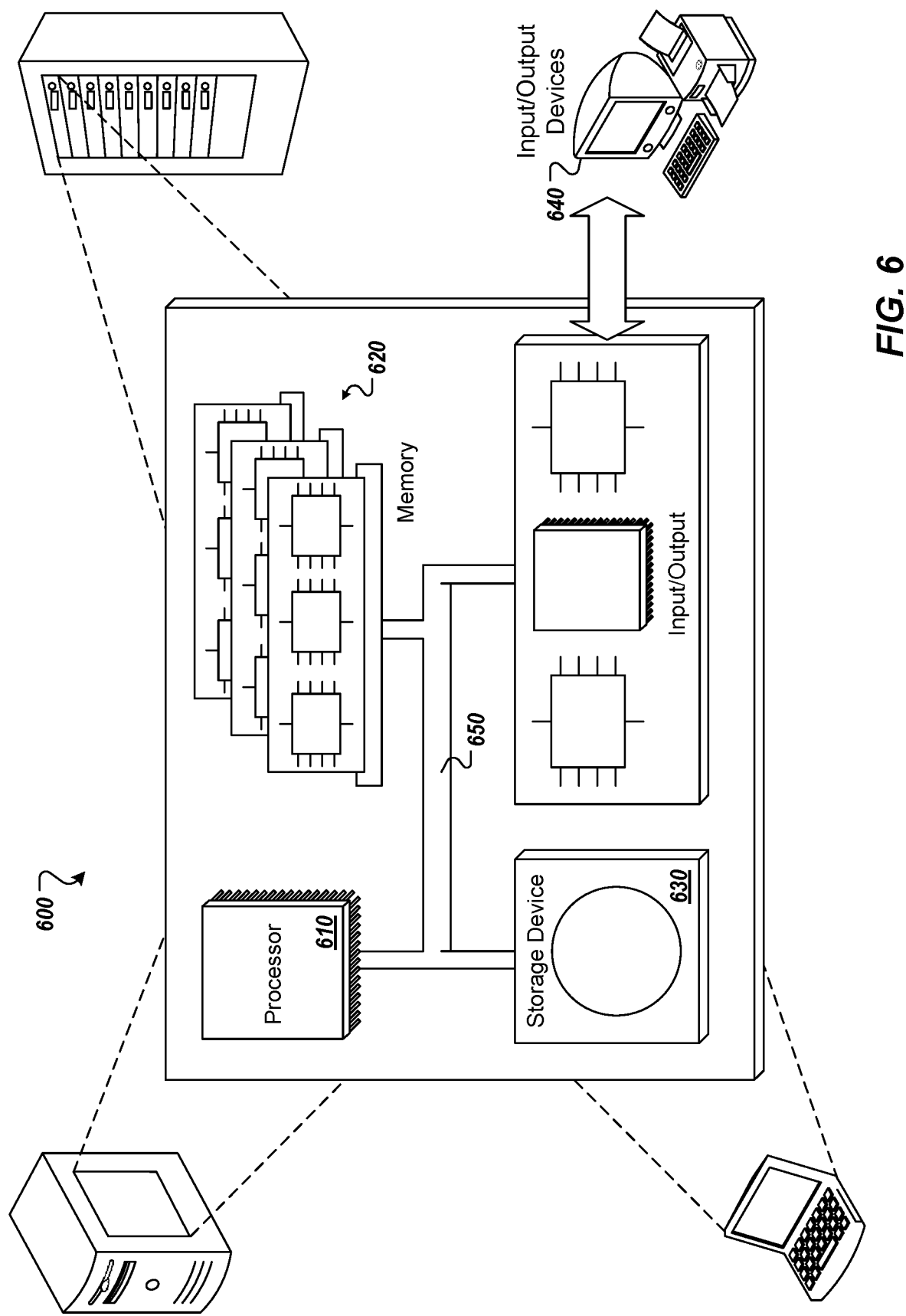
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figure do not require the particular order shown, or sequential order, to achieve desirable results. In addition, other steps may be provided, or steps may be eliminated, from the described lows, and other components may be added to, or removed from, the described systems. Accordingly, other implementations are within the scope of the following claim.

A number of implementations of the present disclosure have been described. Nevertheless, it will be understood that various modification may be made without departing from the spirit and scope of the present disclosure. Accordingly, other implementations are within the scope of the following claims.

What is claimed is:

1. A computer-implemented method for providing a cache to store instances of data from a database system, the method being executed by one or more processors and comprising:
   providing two or more map paths, each map path representing a set of models and relationships between models for data stored in a database system;
   determining, at least partially based on metadata associated with each of the two or more map paths, that at least one update has occurred, and in response:
   deleting at least a portion of the cache representative of the at least one update;
   combining the two or more map paths to provide a map path tree that at least partially defines a data structure for storing at least a portion of the data stored in the database system in the cache, the map path tree comprising a uni-directional graph comprising multiple child nodes, each child node having a single input edge from a single node;
   querying the database system by recursively traversing the map path tree to retrieve data instances from the database system; and
   storing each data instance in the cache using the data structure, at least one data instance comprising an update of the at least a portion of the cache that was deleted.

2. The method of claim 1, wherein the relationships comprise one-way parent-child relationships between models in the set of models.

3. The method of claim 1, further comprising:
   determining that a relationship represented in the map path tree includes a violation of a one-way parent-child relationship; and
   adjusting the map path tree to obviate the violation.

4. The method of claim 1, wherein each map path comprises two or more period-separated model names, each model name representative of a model in the set of models.

5. The method of claim 1, wherein providing a cache is executed in response to an event comprising one or more of an expiration event, a manual event, and application start-up event.

6. The method of claim 1, wherein combining the two or more paths comprises providing multiple instances of a common node in the map path tree.

7. The method of claim 1, wherein the database system comprises a relational database and data is stored in two or more relational tables within the database system.

8. A non-transitory computer-readable storage medium coupled to one or more processors and having instructions stored thereon which, when executed by the one or more processors, cause the one or more processors to perform operations for providing a cache to store instances of data from a database system, the operations comprising:
   providing two or more map paths, each map path representing a set of models and relationships between models for data stored in a database system;
   determining, at least partially based on metadata associated with each of the two or more map paths, that at least one update has occurred, and in response:
   deleting at least a portion of the cache representative of the at least one update:
   combining the two or more map paths to provide a map path tree that at least partially defines a data structure for storing at least a portion of the data stored in the database system in the cache, the map path tree comprising a uni-directional graph comprising multiple child nodes, each child node having a single input edge from a single node;
   querying the database system by recursively traversing the map path tree to retrieve data instances from the database system; and
   storing each data instance in the cache using the data structure, at least one data instance comprising an update of the at least a portion of the cache that was deleted.

9. The non-transitory computer-readable storage medium of claim 8, wherein the relationships comprise one-way parent-child relationships between models in the set of models.

10. The non-transitory computer-readable storage medium of claim 8, wherein operations further comprise:
   determining that a relationship represented in the map path tree includes a violation of a one-way parent-child relationship; and
   adjusting the map path tree to obviate the violation.

11. The non-transitory computer-readable storage medium of claim 8, wherein each map path comprises two or more period-separated model names, each model name representative of a model in the set of models.

12. The non-transitory computer-readable storage medium of claim 8, wherein providing a cache is executed in response to an event comprising one or an expiration event, a manual event, and application start-up event.

13. The non-transitory computer-readable storage medium of claim 8, wherein combining the two or more paths comprises providing multiple instances of a common node in the map path tree.

14. The non-transitory computer-readable storage medium of claim 8, wherein the database system comprises a relational database and data is stored in two or more relational tables within the database system.

15. A system, comprising:
a computing device; and
a computer-readable storage device coupled to the computing device and having instructions stored thereon which, when executed by the computing device, cause the computing device to perform operations for providing a cache to store instances of data from a database system, the operations comprising:
providing two or more map paths, each map path representing a set of models and relationships between models for data stored in a database system;
determining, at least partially based on metadata associated with each of the two or more map paths, that at least one update has occurred, and in response:
deleting at least a portion of the cache representative of the at least one update;
combining the two or more map paths to provide a map path tree that at least partially defines a data structure for storing at least a portion of the data stored in the database system in the cache, the map path tree comprising a uni-directional graph comprising multiple child nodes, each child node having a single input edge from a single node;
querying the database system by recursively traversing the map path tree to retrieve data instances from the database system; and
storing each data instance in the cache using the data structure, at least one data instance comprising an update of the at least a portion of the cache that was deleted.

16. The system of claim 15, wherein the relationships comprise one-way parent-child relationships between models in the set of models.

17. The system of claim 15, wherein operations further comprise:
determining that a relationship represented in the map path tree includes a violation of a one-way parent-child relationship; and
adjusting the map path tree to obviate the violation.

18. The system of claim 15, wherein each map path comprises two or more period-separated model names, each model name representative of a model in the set of models.

19. The system of claim 15, wherein providing a cache is executed in response to an event comprising one or an expiration event, a manual event, and application start-up event.

20. The system of claim 15, wherein combining the two or more paths comprises providing multiple instances of a common node in the map path tree.

\* \* \* \* \*